United States Patent
Gresh et al.

(10) Patent No.: US 9,091,382 B2
(45) Date of Patent: Jul. 28, 2015

(54) MACHINE-ACTUATED AND REMOVABLE SAFETY CLOSURE WITH ANTI-ROTATION AND MACHINE-RELEASED HOLDER

(75) Inventors: Brian M. Gresh, Tulsa, OK (US); Buddy A. Wilson, Sapulpa, OK (US)

(73) Assignee: TDW Delaware, Inc., Wilmington, DE (US)

(*) Notice: Subject to any disclaimer, the term of this patent is extended or adjusted under 35 U.S.C. 154(b) by 308 days.

(21) Appl. No.: 13/502,984

(22) PCT Filed: Apr. 11, 2012

(86) PCT No.: PCT/US2012/033127
§ 371 (c)(1),
(2), (4) Date: Apr. 19, 2012

(87) PCT Pub. No.: WO2013/022500
PCT Pub. Date: Feb. 14, 2013

(65) Prior Publication Data
US 2013/0186483 A1     Jul. 25, 2013

Related U.S. Application Data

(60) Provisional application No. 61/589,723, filed on Jan. 23, 2012.

(51) Int. Cl.
*B67B 1/00* (2006.01)
*F16L 41/04* (2006.01)
*F16L 55/11* (2006.01)
*F16L 55/136* (2006.01)

(52) U.S. Cl.
CPC ............. *F16L 41/04* (2013.01); *F16L 55/1125* (2013.01); *F16L 55/136* (2013.01)

(58) Field of Classification Search
CPC ................................. F16L 55/10; B67B 1/00
USPC .................... 138/89, 92; 222/153.01–153.14; 70/77–84; 109/71; 137/320
See application file for complete search history.

(56) References Cited

U.S. PATENT DOCUMENTS

| | | | | |
|---|---|---|---|---|
| 1,560,489 A * | 11/1925 | Yager | ............................... | 292/37 |
| 2,573,061 A * | 10/1951 | Raymond | .......................... | 70/81 |
| 4,100,629 A | 7/1978 | Jones et al. | | |
| 4,233,913 A * | 11/1980 | Herrmann | ..................... | 109/59 T |
| 4,342,207 A * | 8/1982 | Holmes et al. | .................. | 70/119 |
| 4,387,740 A * | 6/1983 | Vanzant | .......................... | 138/89 |

(Continued)

FOREIGN PATENT DOCUMENTS

KR     20-0447692     2/2010

*Primary Examiner* — Paul R Durand
*Assistant Examiner* — Andrew P Bainbridge
(74) *Attorney, Agent, or Firm* — Gable Gotwals

(57) ABSTRACT

An improved machine-actuated removable safety closure made according to this invention includes a latch and central hub combination which permits a plug holder to self-align with the drive holes of the closure's cam plate so that an operator can retrieve the closure without having to lean directly over it. A bypass valve interferes with the cam plate when the bypass is in its closed position. This interference prevents the cam plate from actuating the locking leaves. Anti-rotation slots located on the plug body and the flange of the tubular member interlock and prevent rotation of the plug body beyond a certain rotational window during the setting process and when the plug body is in its final sealing position. The latch, along with means to secure the plug holder to the boring bar, allows the holder to be retrieved from the set plug.

17 Claims, 15 Drawing Sheets

(56) References Cited

U.S. PATENT DOCUMENTS

| | | | |
|---|---|---|---|
| 4,693,278 A * | 9/1987 | Wilson et al. | 138/89 |
| 5,348,201 A * | 9/1994 | Koo | 222/556 |
| 5,944,229 A * | 8/1999 | Rokkjaer | 222/153.07 |
| 6,126,043 A * | 10/2000 | Albert, II | 222/340 |
| 6,286,553 B1 * | 9/2001 | Morgan | 138/89 |
| 7,735,689 B2 * | 6/2010 | Alluigi | 222/153.13 |
| 8,001,988 B2 | 8/2011 | Wilson et al. | |
| 2009/0301568 A1 * | 12/2009 | Wilson et al. | 137/15.01 |

\* cited by examiner

MACHINE-ACTUATED AND REMOVABLE SAFETY CLOSURE WITH ANTI-ROTATION AND MACHINE-RELEASED HOLDER

BACKGROUND OF THE INVENTION

This invention relates generally to closures used to close an opening in a tubular member carrying a gas or liquid under pressure. More particularly, it relates to semi-permanent closures used in connection with hot tapping operations.

In hot tapping operations, it is frequently necessary to close an opening in a tubular member either permanently or semi-permanently, that is, to close an opening where a valve is not required or is not desirable. One example of a semi-permanent closure arises when a hot tap is made into a pipeline or a vessel through a fitting connected to the pipeline or vessel. In the typical hot tapping application as utilized in the petroleum industry, a fitting is welded on the exterior of a pipe that has flowing gas or liquid under pressure. The fitting includes a flange on its outlet connection and a hot tapping machine is secured to the flange. By use of highly specialized equipment, a hole can then be drilled through the wall of the pipe while a gas or liquid continues to flow through it to provide access to the interior of the pipe. This access hole or opening can be used to insert equipment which temporarily blocks flow through the pipe while repairs are being made to the pipe. After the repairs are complete, the equipment is removed but the opening that provides communication to the interior of the pipe needs to be closed. Preferably the closure is made in such a way that at some future date access can be again obtained through the fitting to the interior of the pipe.

Because the tubular member is under pressure, a closure member must be in a properly locked position before the closure member is exposed to atmospheric pressure. An improperly locked closure member can blow out, causing serious injury to an operator or other persons nearby. Therefore, it is critically important that the operator know as a certainty that the closure member is properly aligned and locked before exposing the area above the closure member to atmospheric pressure, and will remain in this aligned and locked position over time. However, because of the challenges associated with completion plug systems above 20 inches and capable of withstanding fully rated 600 lb pressures, while having no leak paths except through the gasket and remaining retrievable, have not yet been developed. Additionally, the ability to set a plug of this size and class without manually removing the holder from the plug has never been implemented. The instability of the plug (due to limited length of engagement between the holder and plug) and the limited flow through the bypass of that system (because the bypass vents the fluid through mating threads) prevented a machine-actuated holder from being used for larger sizes and higher pressures. Finally, anti-rotation has not been implemented for completion plugs of this size or class, as well as smaller sizes and classes. Prior art removable closure systems rely on friction between the o-ring and flange to prevent the plugs from rotating. There is an initial cost savings by not having anti-rotation, but there is more long-term cost savings by preventing pig collisions with the plug or coupon and having the added safety of anti-rotation during the plug setting process.

SUMMARY OF THE INVENTION

Similar to other removable completion plugs, the main purpose of this invention is to temporarily seal a pipeline inside of a flange of a branch fitting until a blind flange is installed. The new features of a removable safety closure made according to this invention and method for its installation improves safety and reliability relative to those other completion plugs, especially for plugs above 20 inches. The new features include:

anti-rotation slots in the plug body and flange which interlock with one another. This addresses two issues. First, the interlocked slots prevent the plug from rotating during its installation as the leaves are being actuated by the tapping machine and moved to an extended position. Because plug rotation is prevented, the leaves engage fully into the flange after the boring bar of the tapping machine is rotated the specified angle. Second, it guarantees that a pig collision with the coupon (should one occur) would not be caused by the plug as the plug deviates over time from its initial set position due to vibration and pressure fluctuation.

a plug holder which disconnects from the plug body but stays connected to the boring bar of the tapping machine after the plug is set. This prevents an operator from having to lean directly over the plug while it's under pressure in order to remove the plug holder.

the ability to retrieve the set, pressurized plug without the need for an operator to be positioned directly over the plug. In one embodiment of the invention, a retrieval screw on top of the cam plate is used as a rotational stop so the plug holder can be correctly positioned by the feel of the tapping machine's rotating hand crank coming to a stop. In another embodiment, the rotational stop is built into the plug body's central hub so the plug holder can be correctly positioned, again by the feel of the tapping machine's rotating hand crank coming to a stop. Both rotational stop means provide a wide rotational window in which the plug holder can be oriented before the holder is lowered in the flange by the boring bar of the tapping machine to retrieve the plug.

the ability to disconnect the plug holder from the plug without having to actuate the tapping machine's retainer rod during the plug setting process. The plug holder disconnects from the set plug just by rotating the boring bar.

the plug is locked rotationally on the boring bar until the boring bar pushes against the plug with enough force to compress a spacer (preferably an elastomeric spacer) in the plug. This ensures that the leaves cannot be extended until the plug is pushing against a ledge in the flange which arrests the plug's downward travel.

easier alignment of the plug with the boring bar. Prior art plug designs have one lifting point which is off center relative to the plug's center of gravity. The off-center lifting point made assembly with the tapping machine difficult. The new plug has two lifting points which straddle the plug's center of gravity. This allows for the plug to be aligned with the boring bar before mounting the plug onto the plug holder.

Therefore, an improved machine-actuated removable safety closure for a tubular member made according to this invention includes one or more of the following features:

a plurality of cam-actuated leaves residing above a cam plate of a plug body of the closure, the cam plate including drive holes for receiving respective drive pins of a rotatable plug holder, the drive pins of the rotatable plug holder engaging the drive holes of the cam plate and moving the plurality of cam-actuated leaves between a retracted first position and an expanded second position as the rotatable plug holder rotates between a start position and an end position;

a first anti-rotation slot located on an external circumferential surface of the plug body and a second anti-rotation slot located on an internal circumferential surface of a flange of a tubular member which receives the plug body, the first and second anti-rotation slots arranged to interlock with one another and prevent the plug body from rotating, or significantly limit its rotation, as the plurality of cam-actuated leaves are moved between the retracted first position and the expanded second position (and for as long as the set, pressurized plug remains in the flange);

a rotatable plug holder having a static or moveable latch which engages a central hub of the plug body and helps align the drive pins with the drive holes in addition to temporarily and releaseably securing the plug body to the rotatable plug holder;

in the static latch embodiment of the invention, there is no need to actuate the retainer rod during the plug setting process (actuation of the retainer rod is only needed for initial installation of the plug onto the boring bar and final removal of the plug holder from the boring bar);

means for securing the rotatable plug holder to a boring bar of a tapping machine after the retainer rod is unthreaded, the securing means (e.g. a set of shoulder screws) enabling the rotatable plug holder to stay secured to the boring bar after the plug is set, the retainer rod is unthreaded, and the holder releases itself from the plug body;

a rotational stop, which may be located on an upper surface of the cam plate or on a top surface of a hub of the plug body, that prevents the rotatable plug holder from rotating past a full 90° when the respective drive pins are about flush with a top surface of the cam plate and not engaged with the drive holes and places the respective drive pins in a proper position above the drive holes to retrieve the closure from within the flange of the tubular member;

a hub stop preventing the holder from rotating a full 180° and positioning a latch (or set of latches) and drive pins with a latch slot (or slots) and drive holes, respectively;

a bypass valve offset from the central axis of the plug body, the bypass valve when in the opened position allowing product flow through the bypass valve and therefore the plug body, wherein the bypass valve is arranged to lock the cam plate and prevent rotation of the cam plate when the plurality of cam-actuated leaves are in the retracted first position (or when fully extended), one of the plurality of drive holes permitting a drive pin of the rotatable plug holder to engage the bypass valve to unlock the cam plate and move the bypass valve between a closed position and the opened position, the bypass valve not venting product about a circumferential external surface of the plug body (e.g., through the threads), the cam plate keeping the bypass valve in the open position in every leaf position except the fully extended second position; and a first and second lifting point straddling the center of gravity of the plug body and permitting the plug body to be aligned with a boring bar prior to the plug body being mounted onto the rotatable plug holder.

engages the slots, the holder drive pins are properly aligned with the cam plate drive holes.

Figure 1:
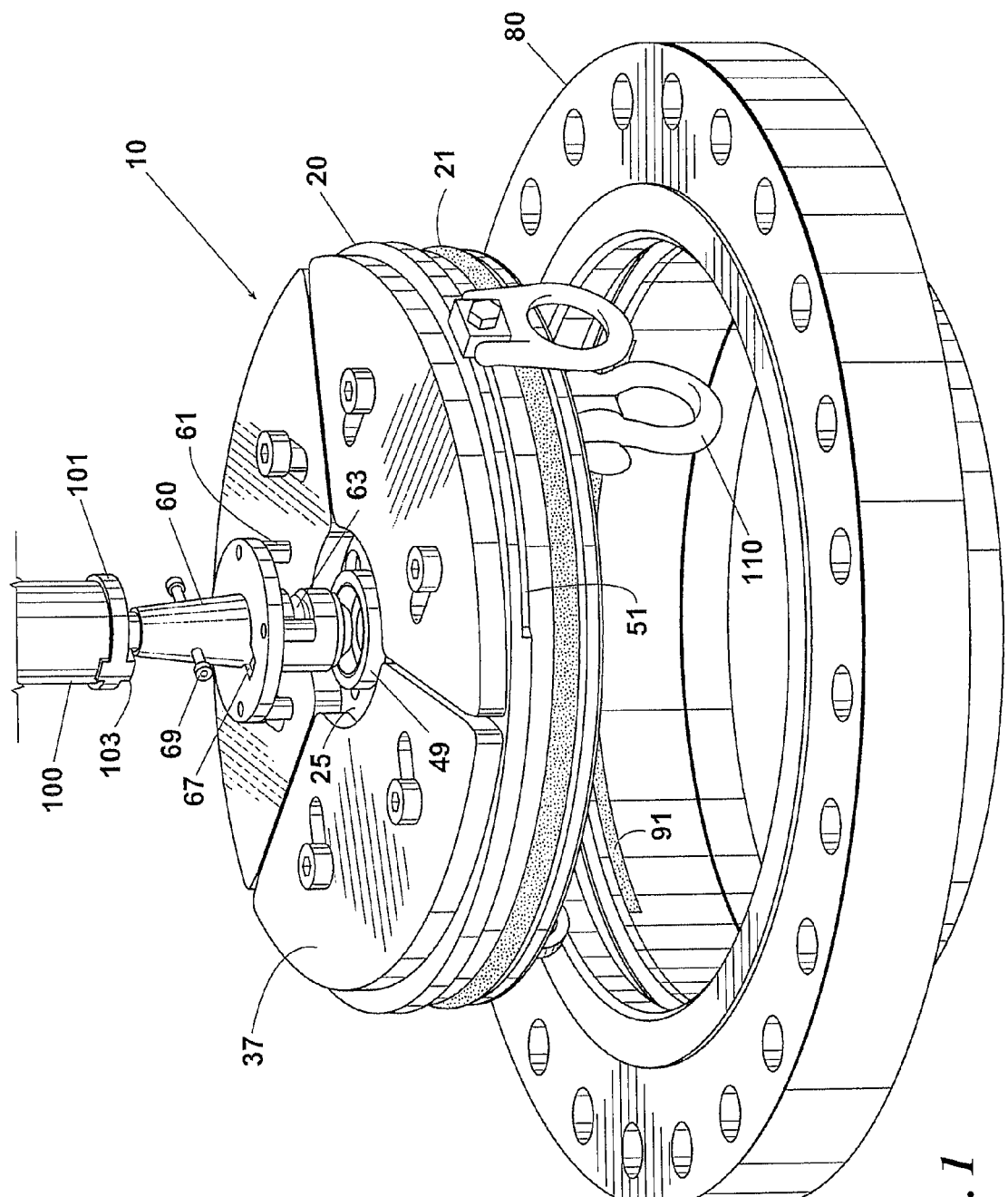
FIG. 1 is an isometric view of one preferred embodiment of a machine-actuated and removable safety closure with anti-rotation and machine-released holder made according to this invention. Anti-rotation slots provided on the plug body (see also FIG. 4B) interlock with those in the flange (see also FIG. 13) and prevent the plug body from rotating, or significantly limit its rotation, as the plurality of cam-actuated leaves are moved between a retracted first position and an expanded second position (see FIG. 3). The slots also prevent rotation of the set plug body. A first and second lifting point straddle the center of gravity of the plug body and permit the plug body to be aligned with a boring bar prior to the plug body being mounted onto the rotatable plug holder.
Figure 2:
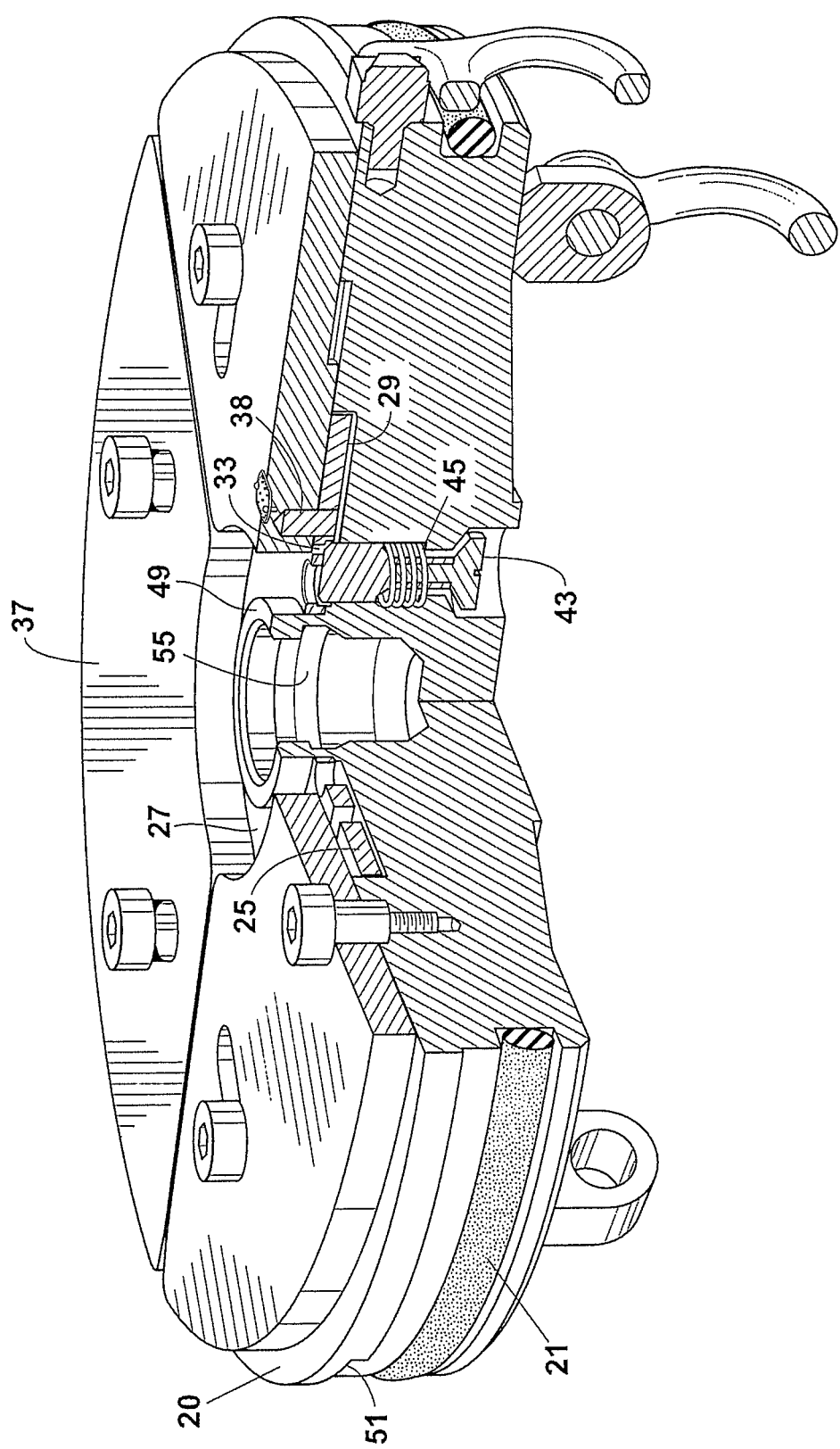
FIG. 2 is a partial cross-section isometric view of the removable safety closure of FIG. 1 with the leaves in a retracted first position. The bypass valve, which is offset from the central axis of the plug body, locks the cam plate when the leaves are in this first position and prevents rotation of the cam plate. The valve also locks the cam plate when the leaves are fully extended.
Figure 3:
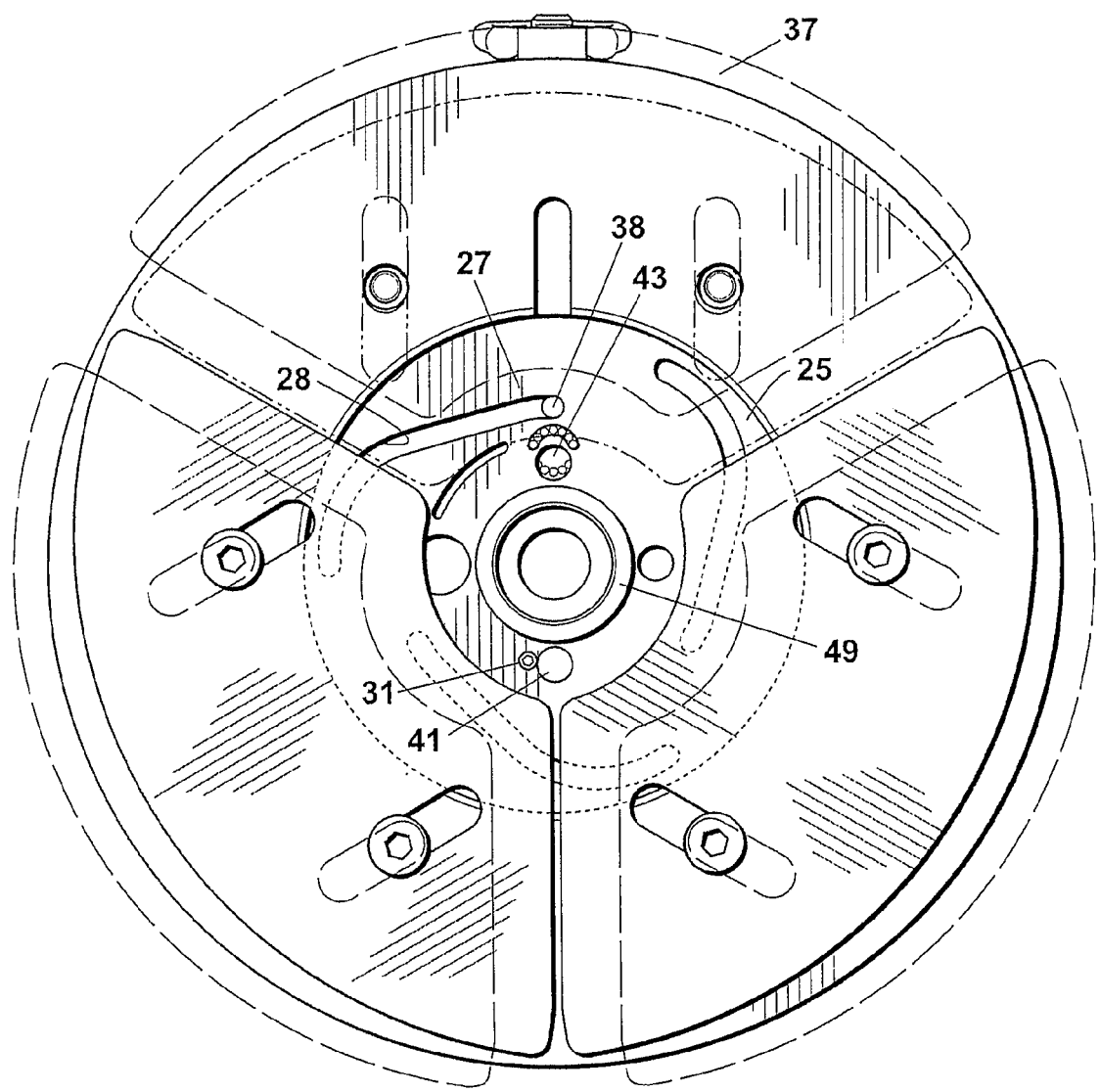
FIG. 3 is a top view of the removable safety closure of FIG. 1. The cam plate permits the leaves to move between a retracted first position and an expanded second position.
Figure 4A:
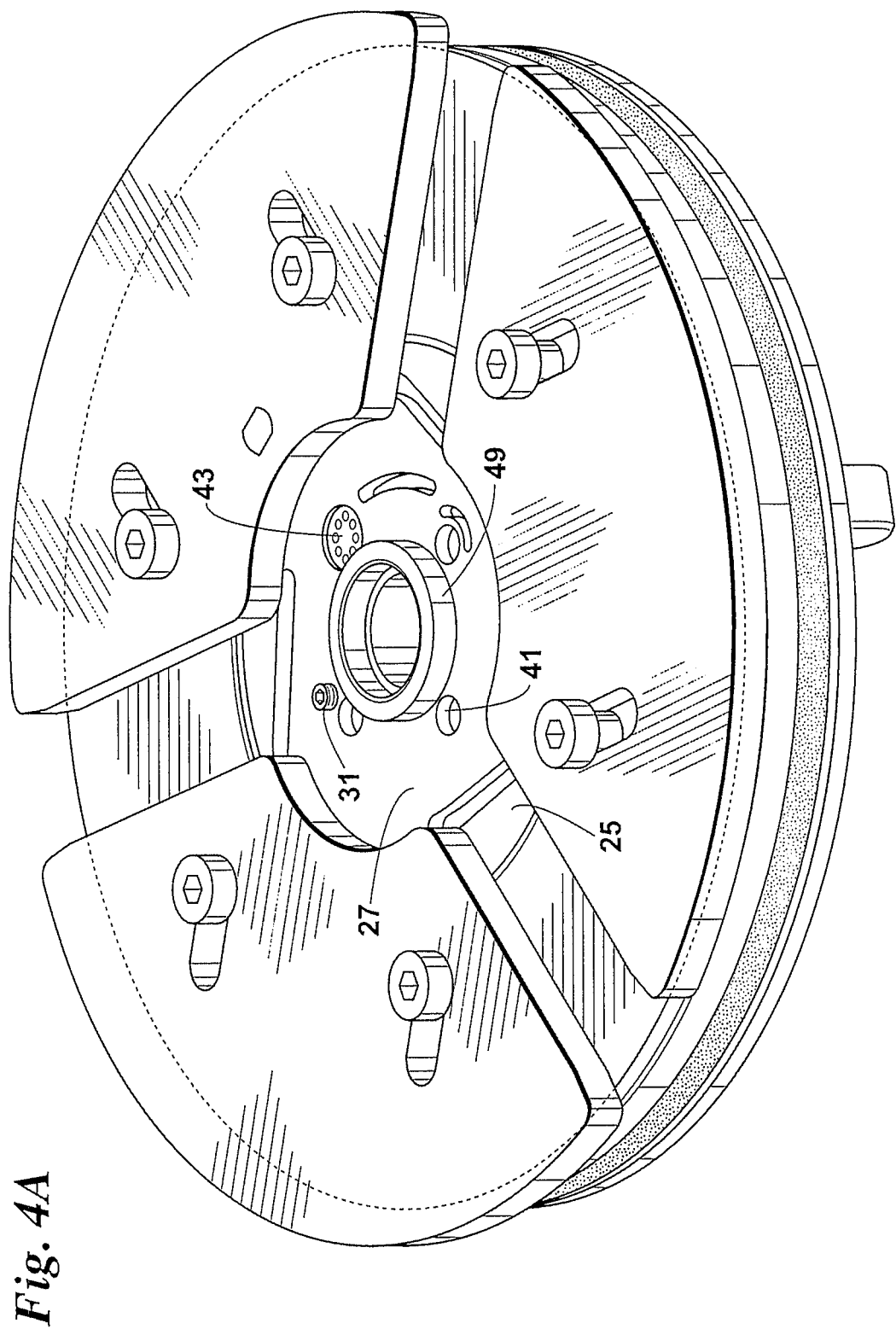
FIG. 4A is an isometric view of the removable safety closure of FIG. 1 with the leaves in the expanded second position and the bypass valve in its fully closed position. A rotational stop, in the form of a retrieval screw located on the upper surface of the cam plate, prevents the rotatable plug holder of FIG. 5 from rotating past a full 90° when the respective drive pins are about flush with a top surface of the cam plate and not engaged with the drive holes and places the respective drive pins in a proper position above the drive holes to retrieve the closure from within the tubular member.
Figure 4B:
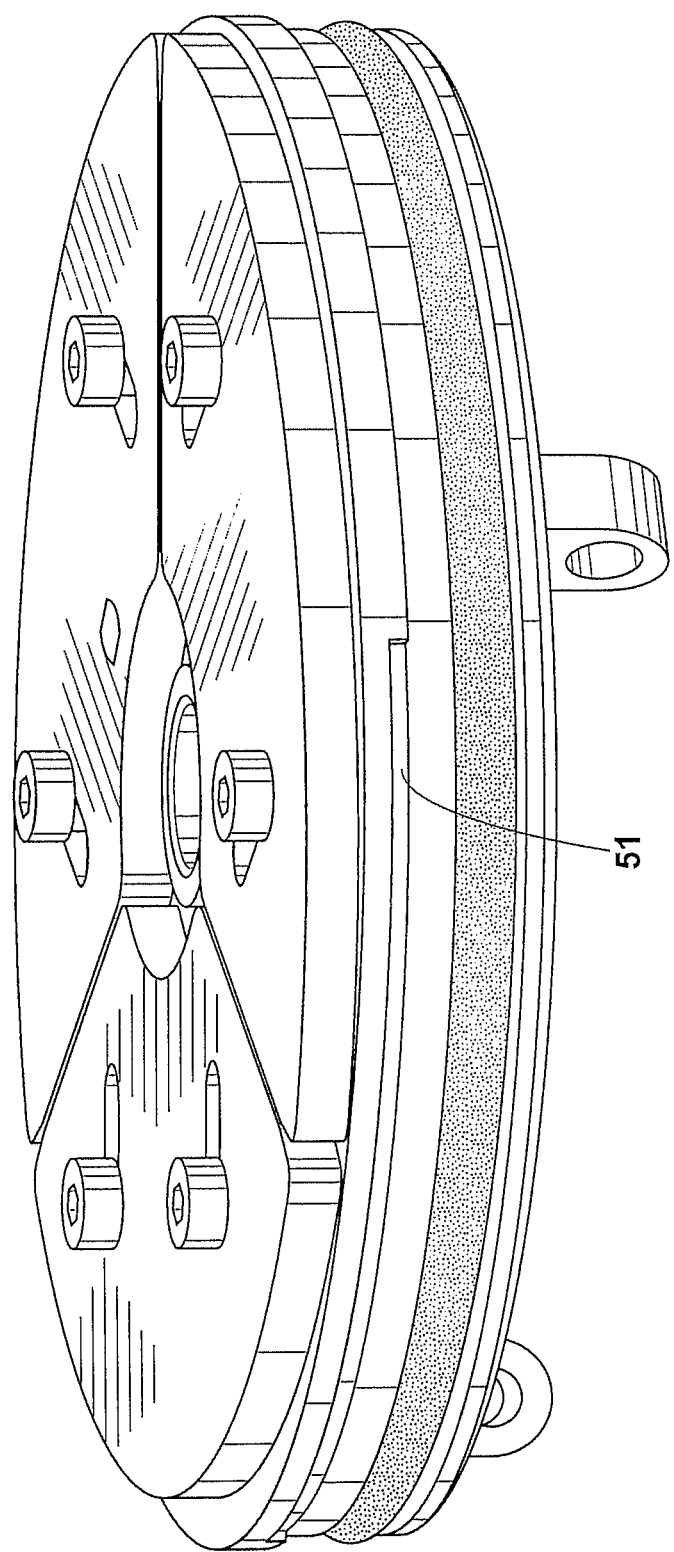
FIG. 4B is an isometric view of the removable safety closure of FIG. 1 with the leaves in the retracted first position.
Figure 5:
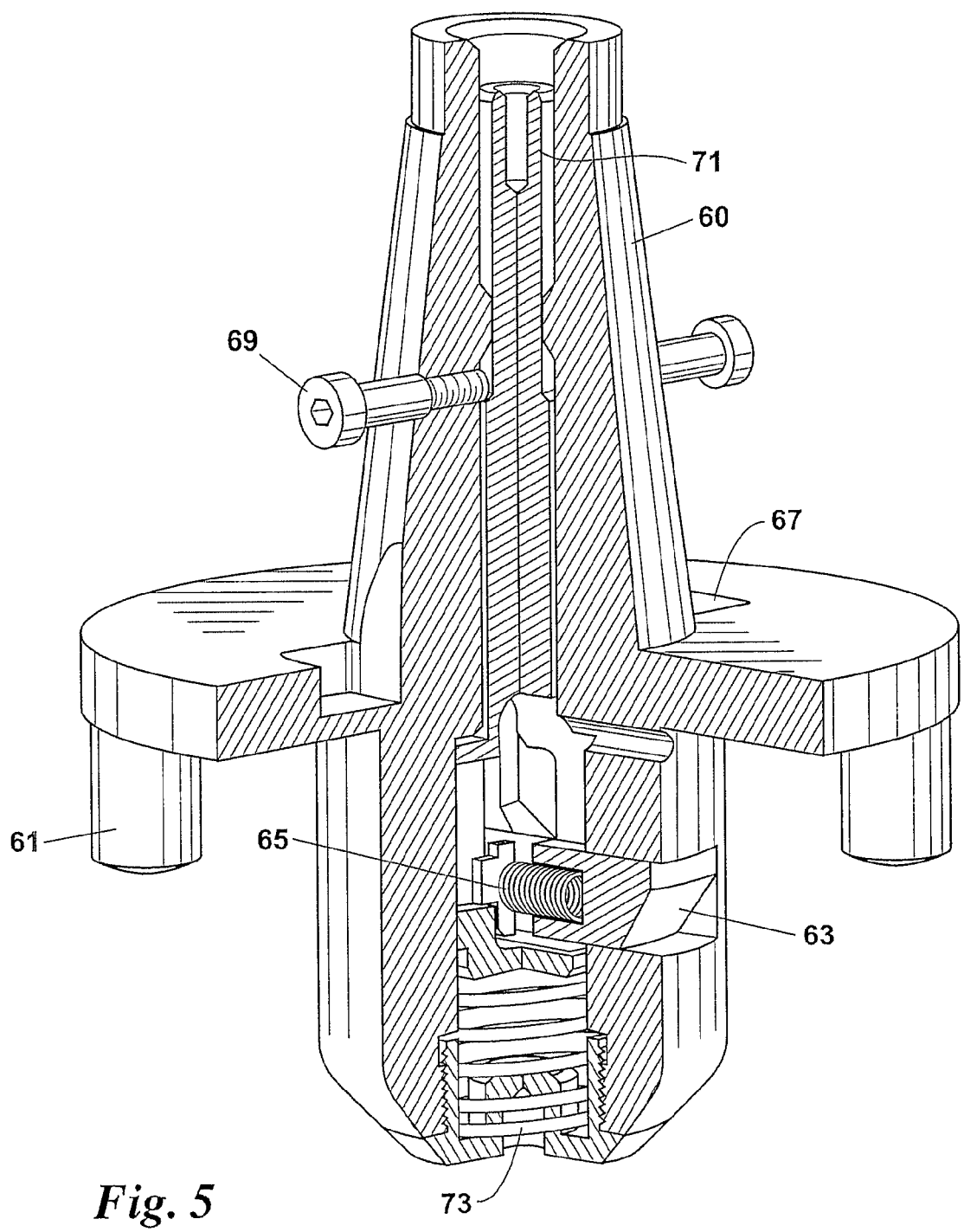
FIG. 5 is a cross-section isometric view of the rotatable plug holder of FIG. 1. The holder includes a moveable latch which engages a central hub of the plug body and temporarily secures the plug body to the rotatable plug holder. The holder also includes means for securing the rotatable plug holder to a boring bar of a tapping machine and allowing the holder to stay secured to the boring bar when the plurality of cam-actuated leaves are in the expanded second position and the latch is removed or released from the plug body.
Figure 6:
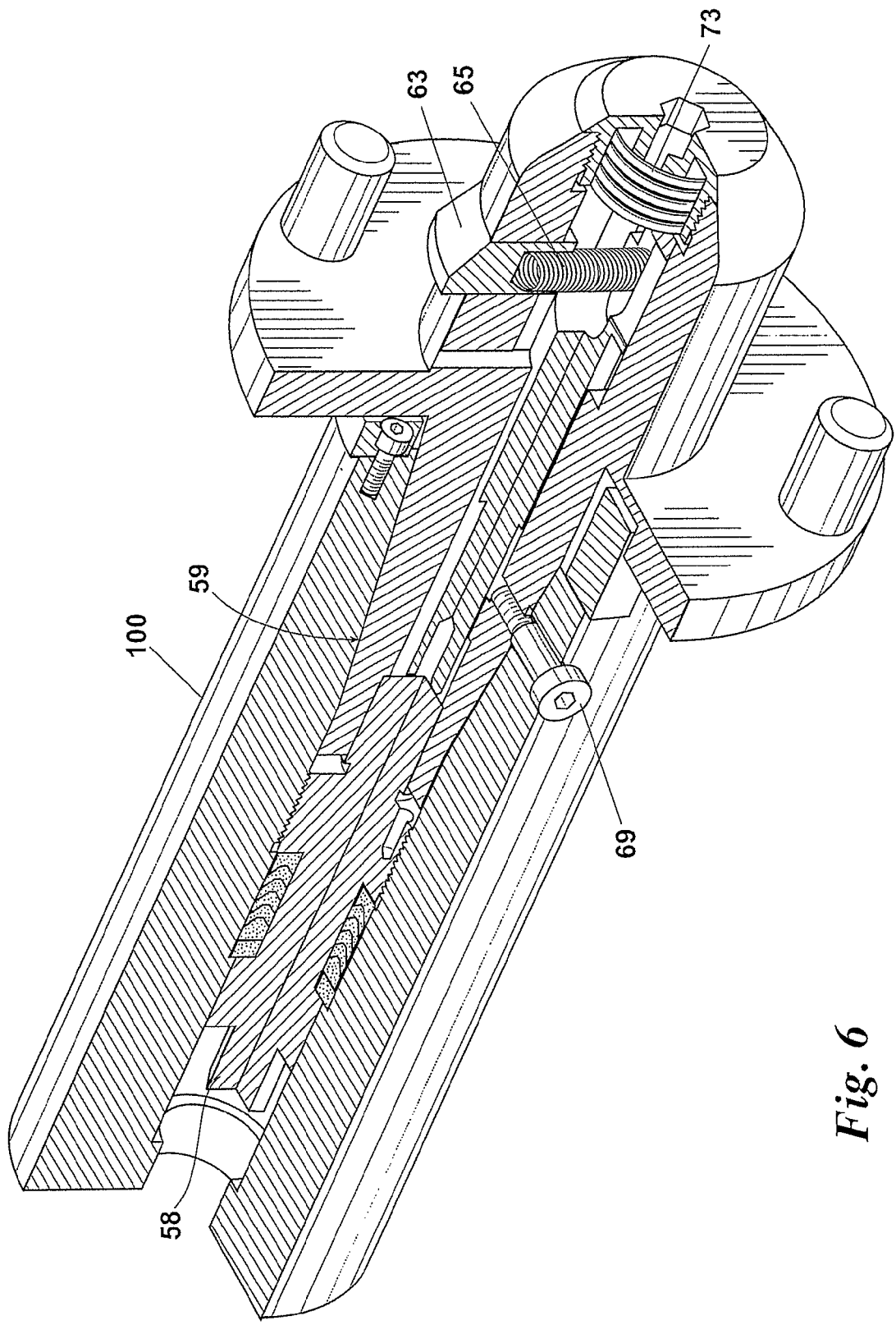
FIG. 6 is a cross-section isometric view of the rotatable plug holder of FIG. 1 secured to the boring bar with the moveable latch in the extended first position.
Figure 9:
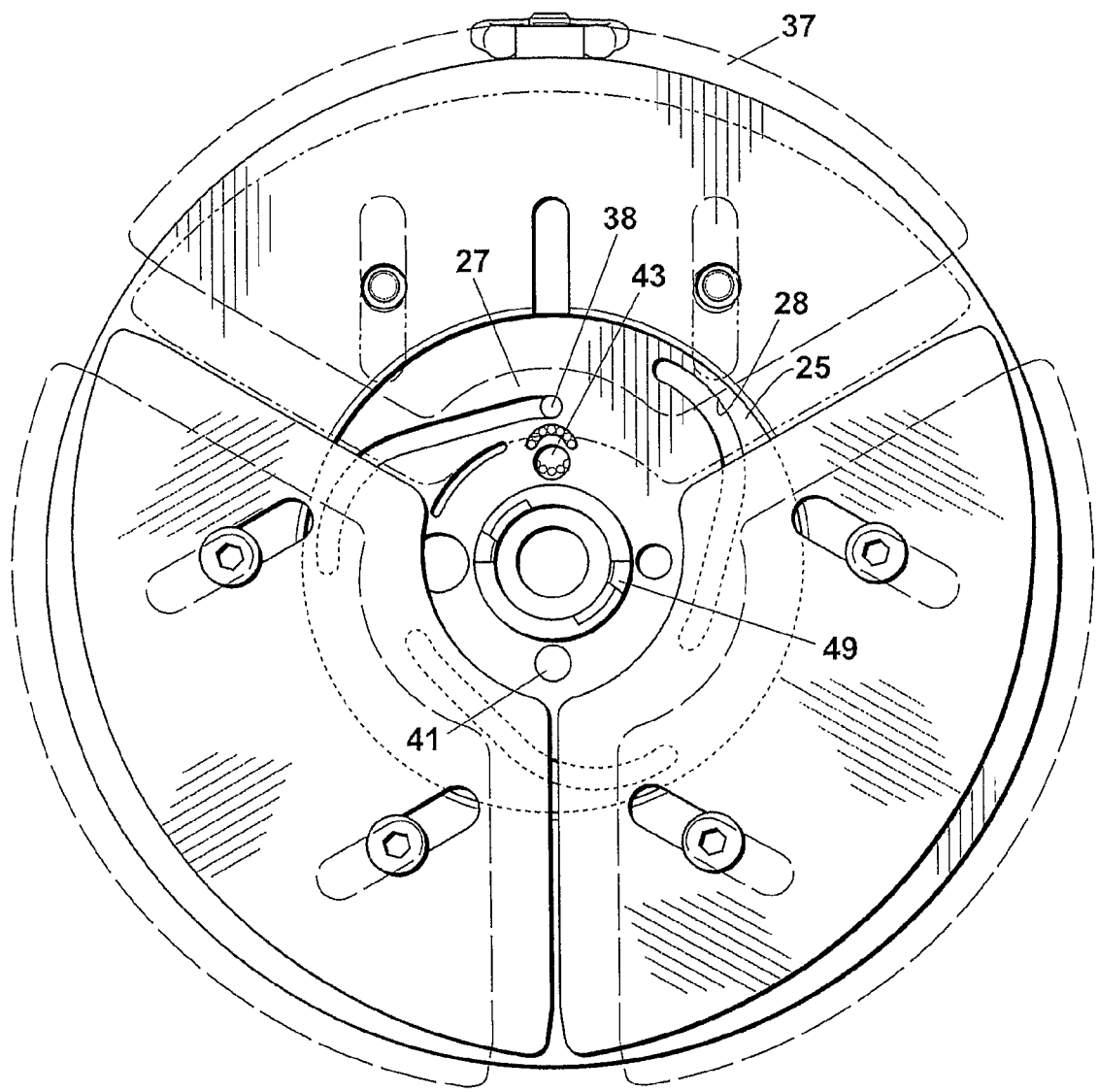
FIG. 9 is a top view of the removable safety closure of FIG. 7. The cam plate permits the leaves to move between a retracted first position and an expanded second position.
Figure 10A:
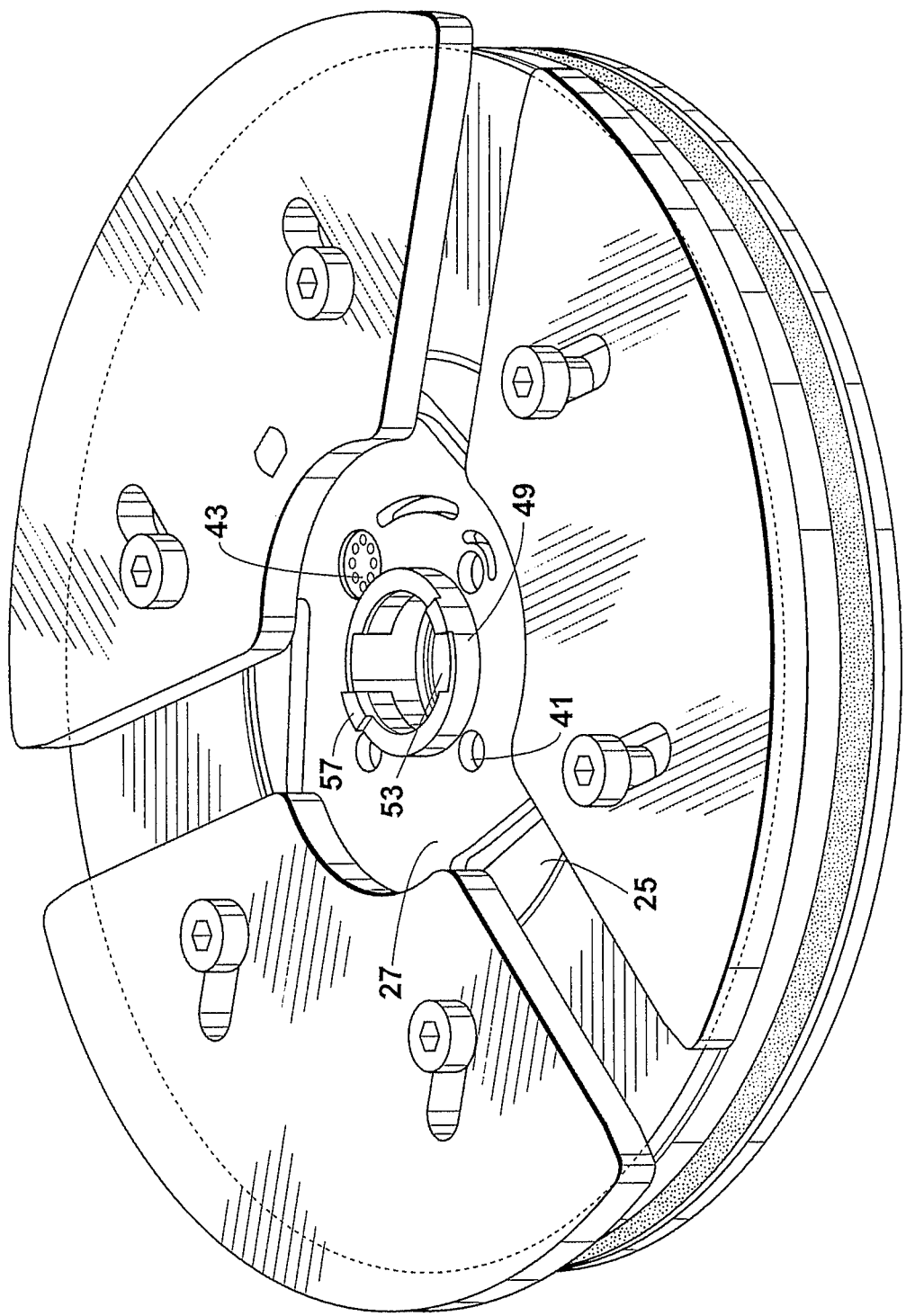
FIG. 10A is an isometric view of the removable safety closure of FIG. 7 with the leaves in the expanded second position and the bypass valve in its fully closed position. Unlike the plug body of FIG. 1, the plug body made according to this embodiment does not include the rotational stop in the form of the retrieval screw (see FIG. 4A) but rather makes use of the raised portions on the central hub for that purpose. When the fixed latch of the rotatable plug holder (see FIG. 11)
Figure 10B:
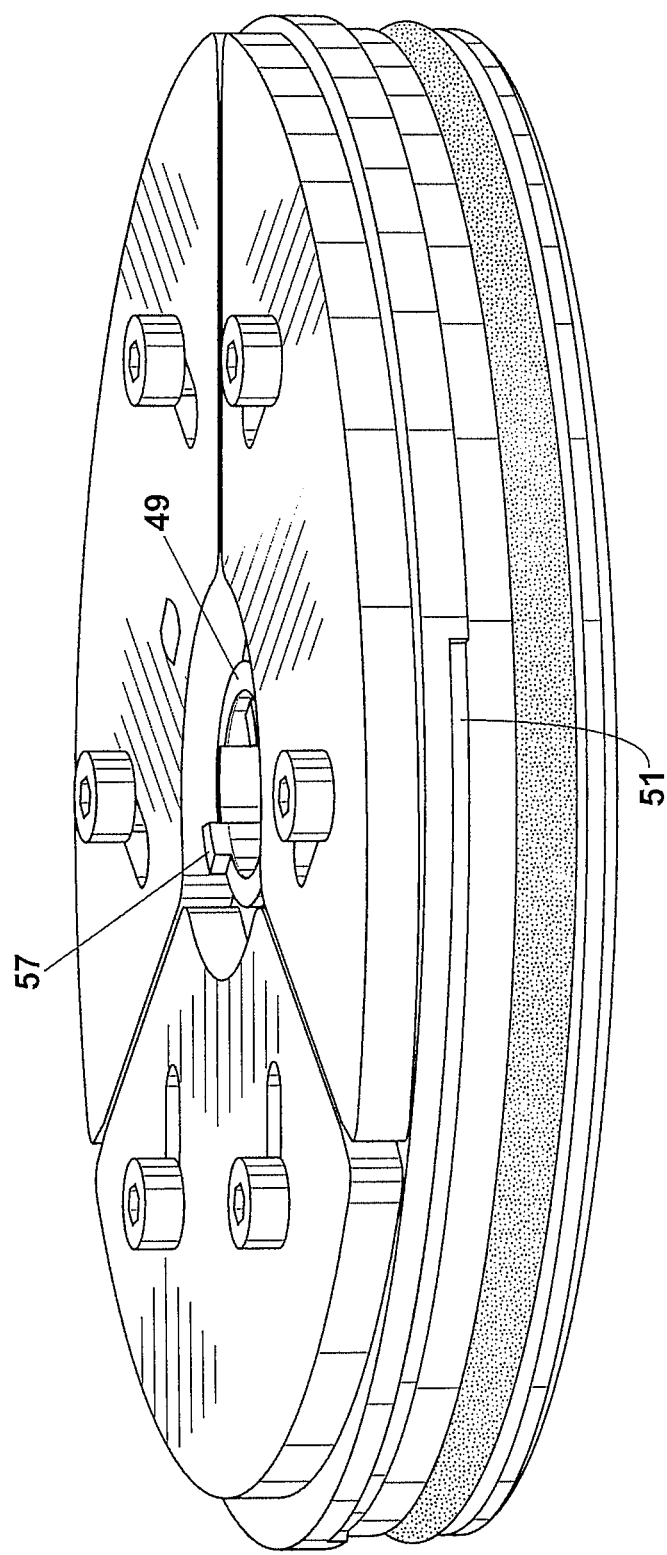

FIG. 10B is an isometric view of the removable safety closure of FIG. 1 with the leaves in the retracted first position. Anti-rotation slots provided on the plug body interlock with those in the flange (see FIGS. 7 & 13) and prevent the plug body from rotating, or significantly limit its rotation, as the plurality of cam-actuated leaves are moved between a retracted first position and an expanded second position (see FIG. 9).

Figure 7:
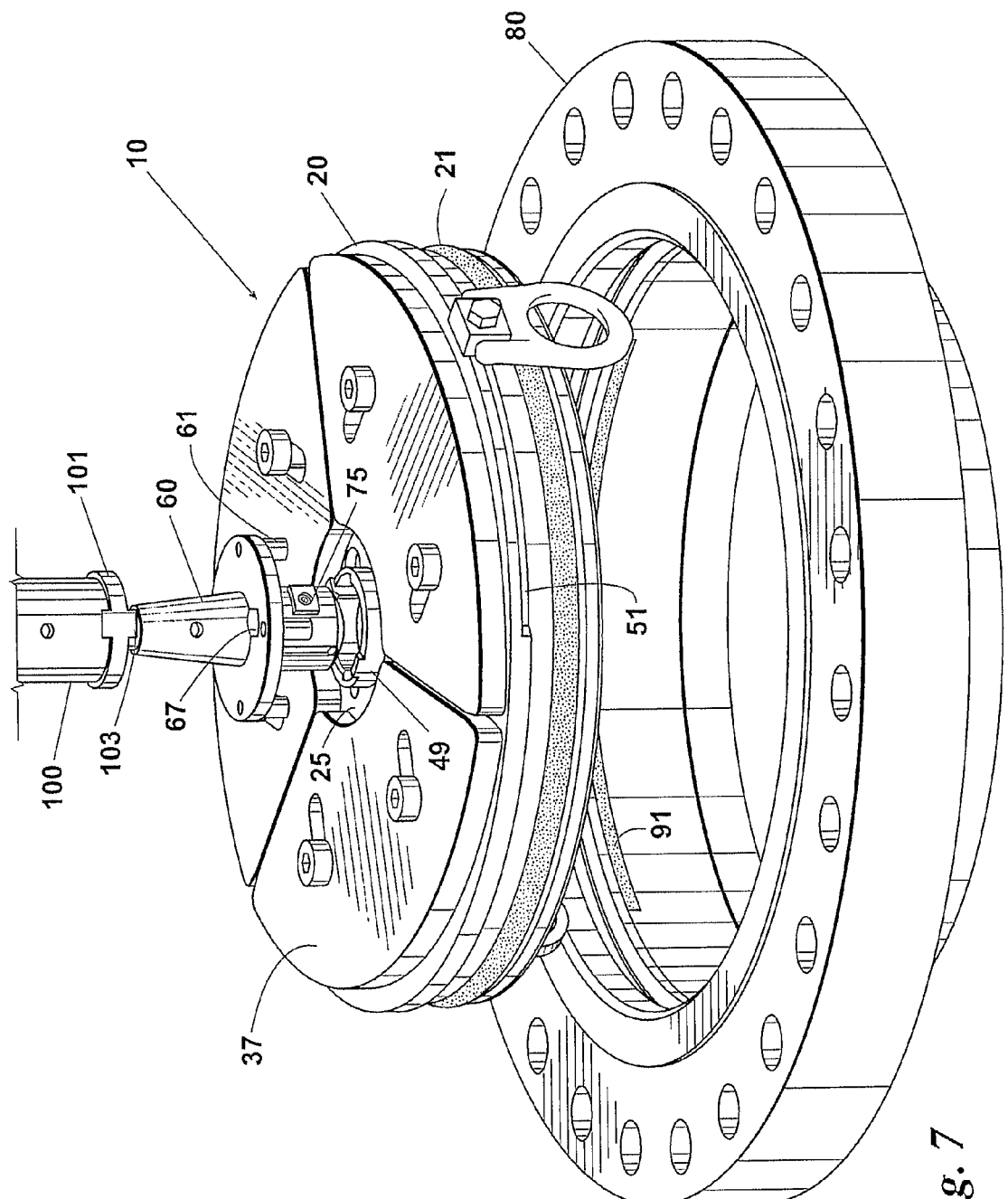
FIG. 7 is an isometric view of one preferred embodiment of a machine-actuated and removable safety closure with anti-rotation and machine-released holder made according to this invention. Unlike the rotatable plug holder of FIG. 1, the holder of this embodiment includes a static latch for securing the holder to the plug body.
Figure 11:
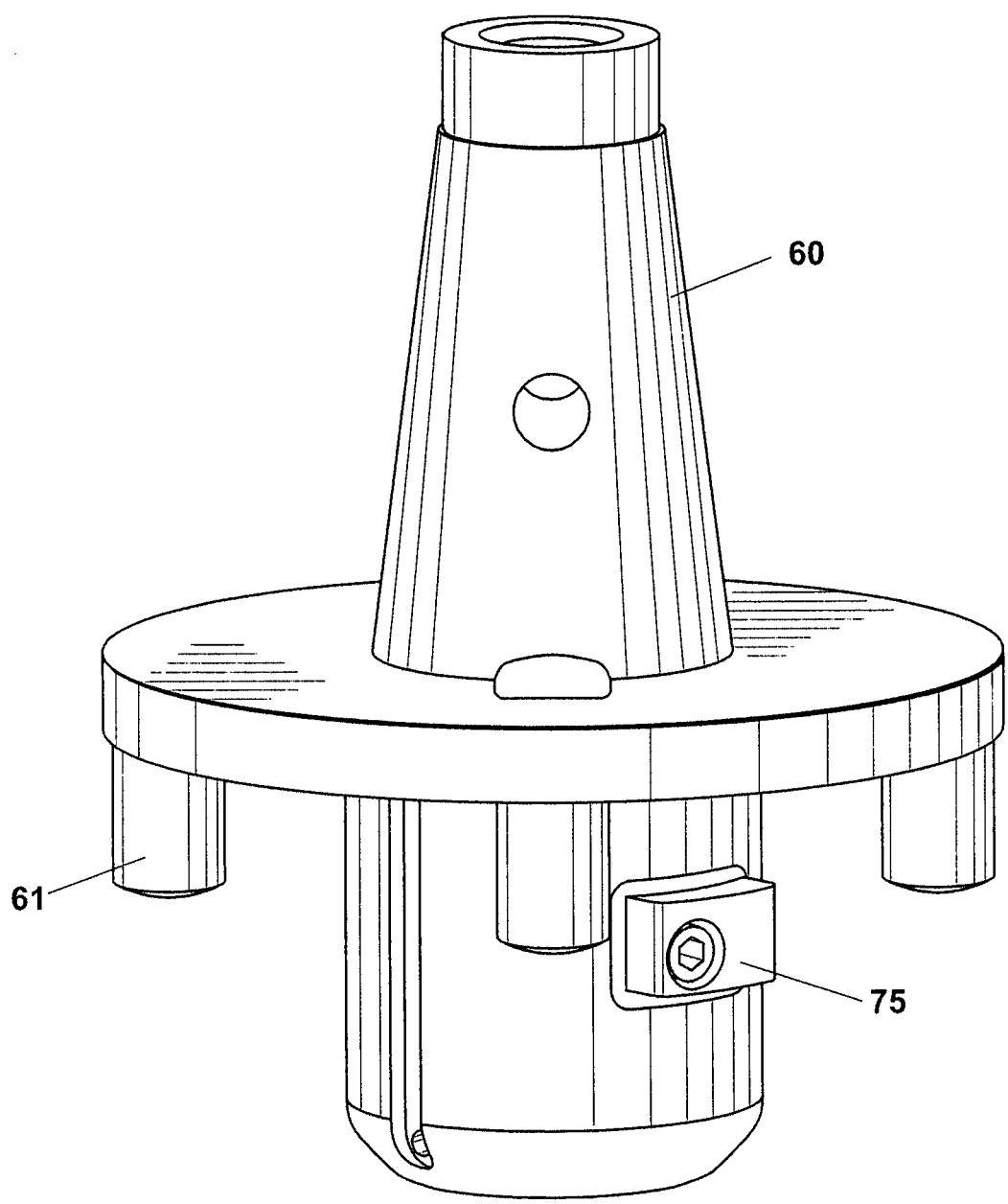

FIG. 11 is an isometric view of the rotatable plug holder of FIG. 7. The holder includes a static latch which engages a central hub of the plug body and temporarily secures the plug body to the rotatable plug holder. The holder also includes means for securing the rotatable plug holder to a boring bar of a tapping machine and allowing the holder to stay secured to the boring bar the entire plug setting process.

Figure 12:
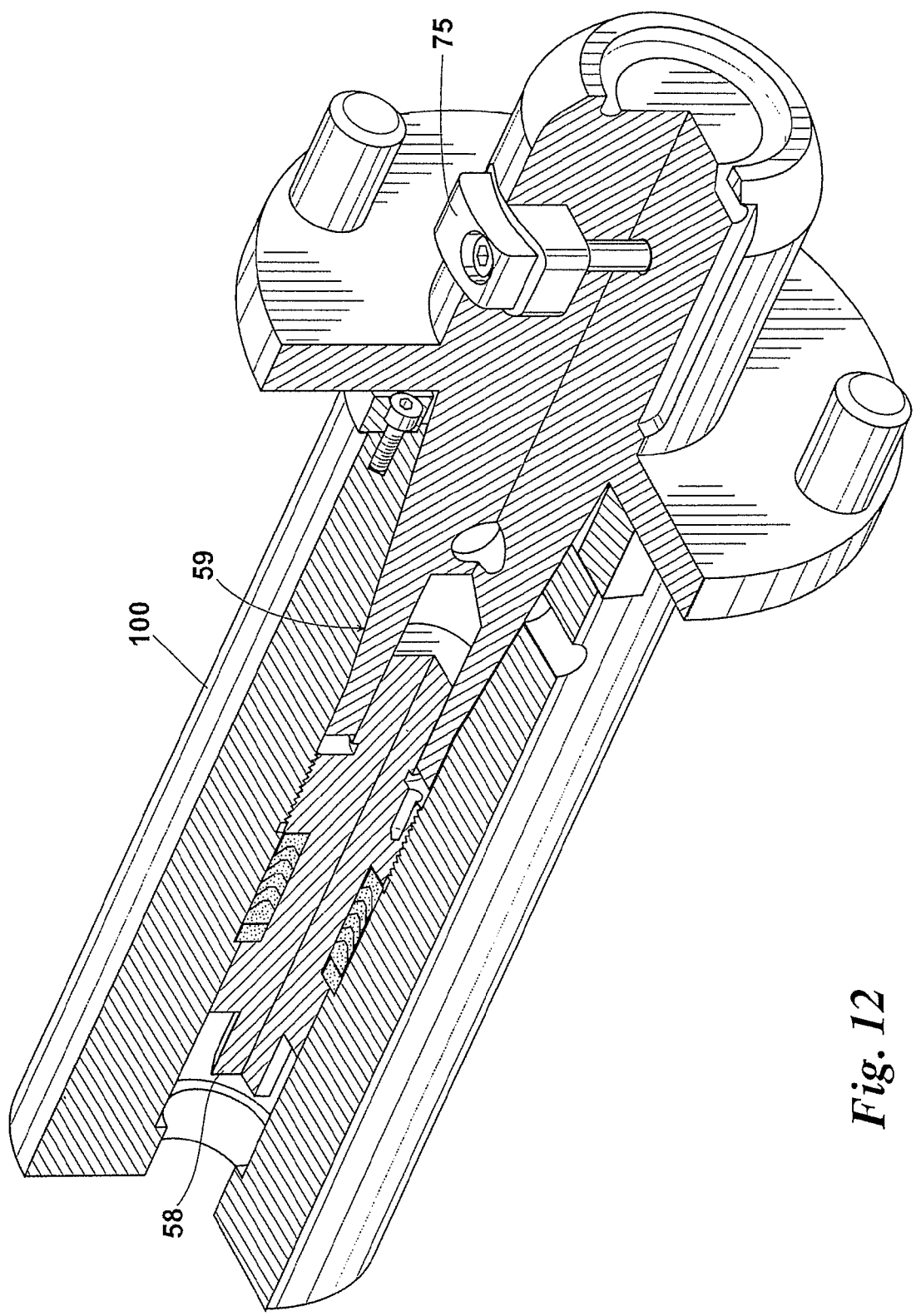

FIG. 12 is a cross-section isometric view of the removable plug holder of FIG. 7 secured to the boring bar.

Figure 13:
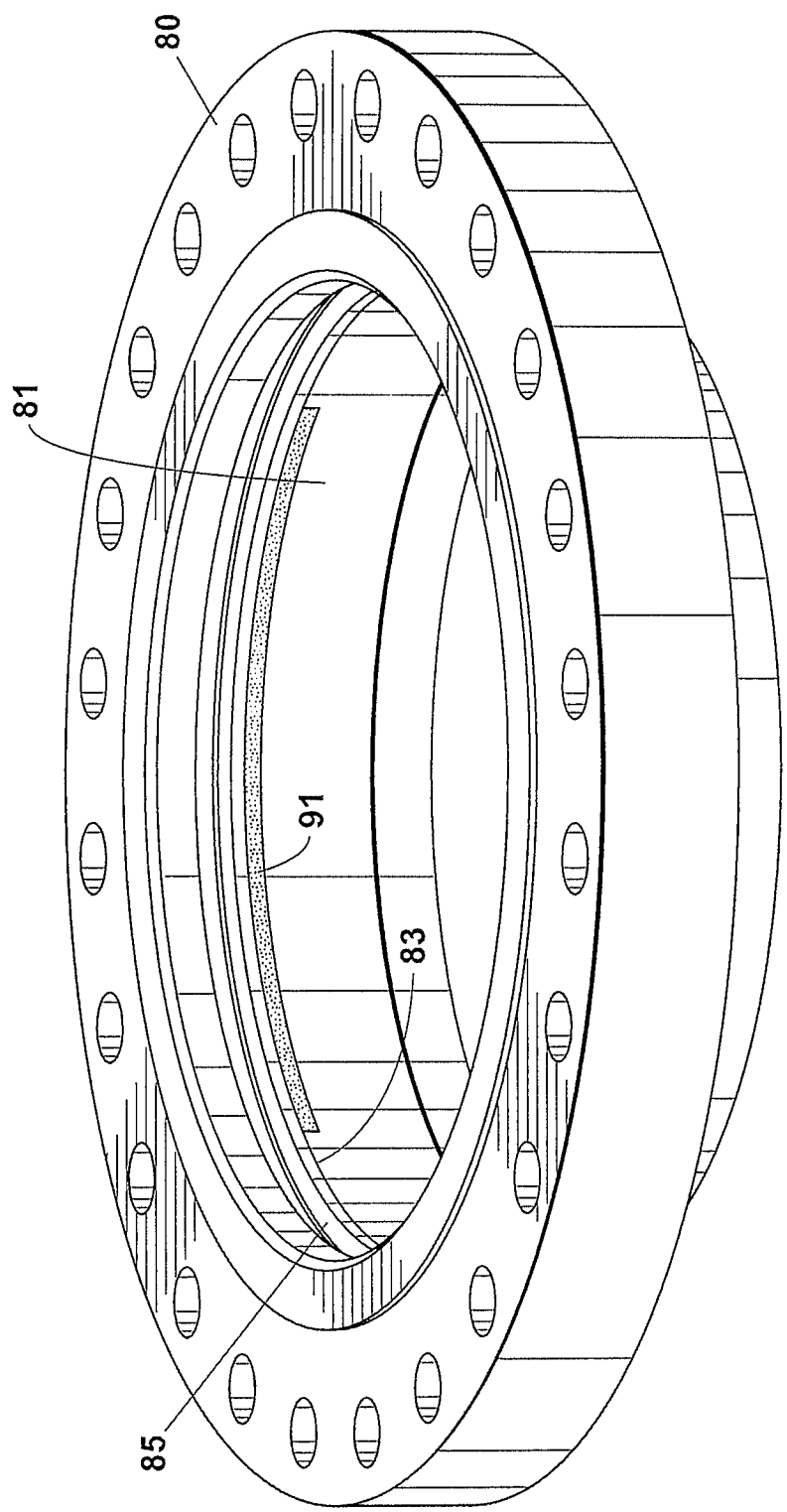

FIG. 13 is an isometric view of a flange made for use with the removable safety closure of FIGS. 1 and 7.

| Elements and Element Numbering Used in the Drawings and Detailed Description | |
|---|---|
| 10 | Safety closure |
| 20 | Plug or plug body |
| 21 | Main seal (circumferential O-ring) |
| 23 | Hub bottom surface |
| 25 | Cam plate |
| 27 | Upper surface of cam plate |
| 28 | Cam slot |
| 29 | Lower surface of cam plate |
| 31 | Retrieval screw |
| 33 | Bypass pocket |
| 37 | Leaf or leaves |
| 38 | Leaf pin |
| 41 | Drive holes |
| 43 | Bypass valve or bypass |
| 45 | Bypass spring |
| 49 | Central hub |
| 50 | Spacer |
| 51 | Anti-rotation slot |
| 53 | Slot |
| 55 | Latch groove |
| 57 | Stop |
| 58 | Retainer rod |
| 59 | Taper |
| 60 | Plug holder or plug holder body |
| 61 | Drive pins |
| 63 | Moveable latch |
| 65 | Latch spring |
| 67 | Pocket for drive ring |
| 69 | Shoulder screws |
| 71 | Plunger |
| 73 | Plunger spring |
| 75 | Static latch |
| 80 | Flange |
| 81 | Inside diameter |
| 83 | Ledge |
| 85 | Leaf groove |
| 90 | Anti-rotation means |
| 91 | Anti-rotation slot |
| 100 | Boring bar |
| 101 | Drive ring |
| 103 | Tabs |
| 110 | Lifting ring |

DETAILED DESCRIPTION OF THE PREFERRED EMBODIMENTS

A machine-actuated and removable safety closure 10 made according to this invention includes anti-rotation means 90, a machine-released plug holder 60, and two lifting points 110 which straddle the plug's center of gravity. The anti-rotation means 90 is in the form of two slots 51, 91 (see e.g. FIGS. 1, 7 and 13) which interlock and prevent the plug body 20 of the closure from rotating past a certain rotational window during the plug setting process and prevents the plug body 20 when in its final sealing position from movement over time due to vibration and pressure differences. The machine-released plug holder 60 includes a moveable or static latch (or set of latches) 63, 75. The static latch 63 interacts with the plug body 20 in such a way as to self-align the drive pins 61 of the holder 60 with the drive holes 41 of the cam plate 25. This is particularly useful when the closure 10 is being removed from the tubular member. In the moveable latch version (discussed below), the lifting points 110 allow the closure 10 to be easily aligned with the boring bar 100 before mounting the plug body 20 onto the plug holder 60.

The closure 10 is especially well-suited for use in completion plug systems above 20 inches (but can be used for smaller size completion systems as well). Similar to the closure disclosed in U.S. Pat. No. 8,001,988 to Wilson et al, which is hereby incorporated by reference, closure 10 makes use of a plurality of cam-actuated leaves 37 which reside on the upper surface 27 of a cam plate 25. The leaves 37 are actuated by engaging the drive pins 61 of the plug holder 60 with the drive holes 41 of the cam plate 25 and rotating the holder 60 (and therefore also the cam plate 25). This rotation moves the leaves 37 between a retracted first position and an extended second position. The bypass 43 of the plug body 20 prevents the cam plate 25 from rotation until the bypass 43 is depressed by one of the drive pins 61 of the holder 60. (The bypass 43 is open even when in the bypass pocket 33 of cam plate 25.)

With the plug body 20 inserted into a flange 80 of a branch fitting (or other tubular member) and the leaves 37 extended to the second position, the leaves 37 engage a groove 85 in the flange 80 and lock the closure 10 in its final sealing position within the flange 80. The main sealing means between the inside diameter 81 of the flange 80 and the plug body 20 of the closure 10 is a circumferential O-ring 21. To help ensure the plug body 20 is positioned at the proper depth within the flange 80, a ledge 83 in the flange 80 arrests the downward travel of the plug body 20 as the body 20 is being lowered by a boring bar 100 of a tapping machine (not shown). This downward arrest places the cam-actuated leaves 37 in line with the groove 85.

Figure 8:
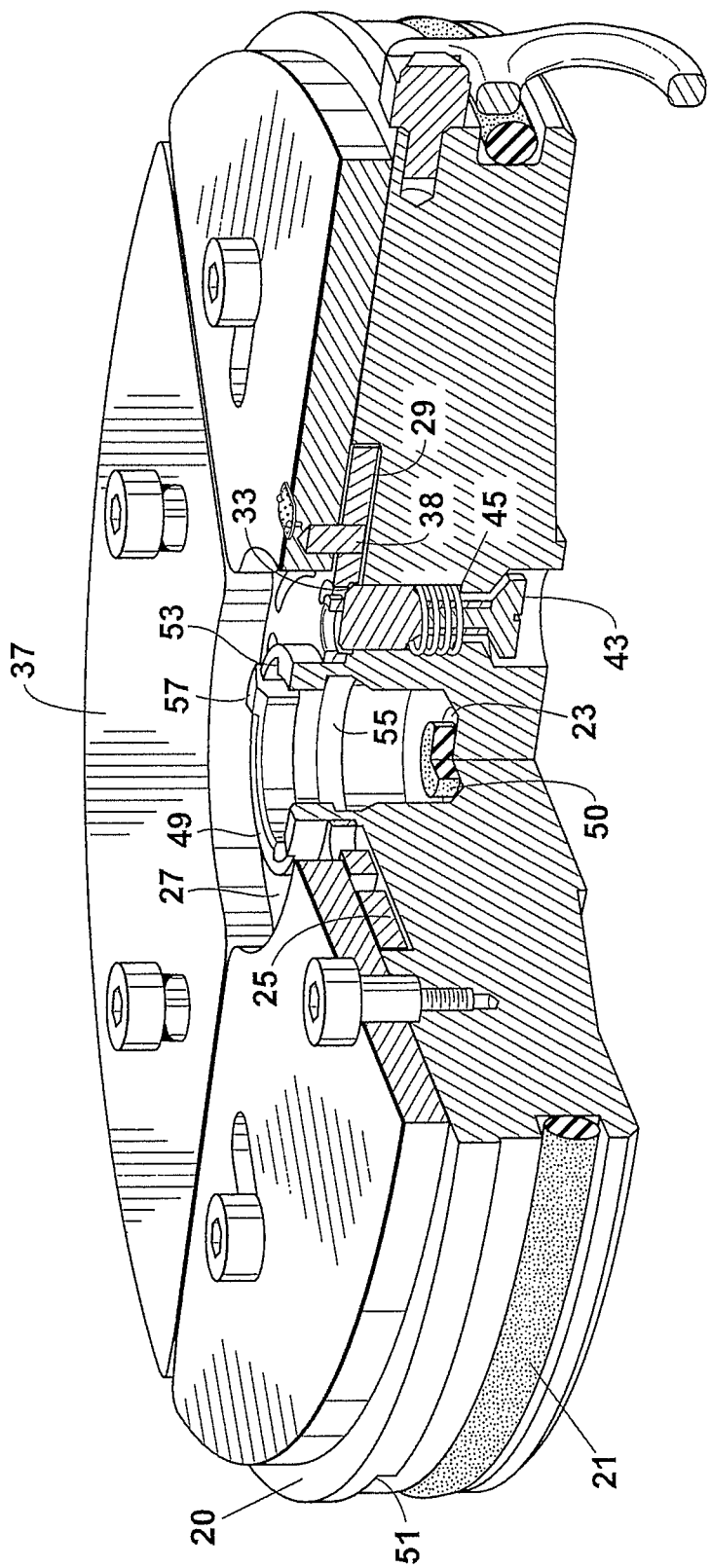
FIG. 8 is a partial cross-section isometric view of the removable safety closure of FIG. 7 with the leaves in a retracted first position. The bypass valve, which is offset from the central axis of the plug body, locks the cam plate when the leaves are in this first position and prevents rotation of the cam plate. Slots in the central hub of the plug body engage with the static latch.

Once the downward travel of plug body 20 is stopped against the ledge 83, the boring bar 100 continues its downward travel until a spacer 50 (see FIG. 8) is compressed and the plug holder 60 comes to a hard stop against the hub bottom surface 23 of the plug body 20. At this point (and unlike prior art closures) one of the drive pins 61 in the plug holder 60 has engaged the bypass 43 and has pushed the bypass 43 down far enough to free it from a pocket 33 located on the lower surface 29 of the cam plate 25. Once the bypass 43 is free of the pocket 33, the cam plate 25 is free to rotate 90° clockwise and the leaves 37 can be extended outward.

Referring now to FIGS. 1 to 6, in one embodiment of the invention ("the moveable latch embodiment"),the latch (or latches) 63 is already in the latch groove 55 since the time the plug body 20 was mounted to the holder 60. The latch 63 permits removal of the plug holder 60 from the plug body 20 once the closure 10 is set and in its final sealing position. The way this is accomplished is by unthreading the retainer rod 58 of the tapping machine. When unthreaded, a plunger spring 73 pushes up a plunger 71 which then pulls in the latch 63. In another embodiment of the invention ("the static latch embodiment," see FIGS. 7 to 12), static latch 75 aligns with a slot 53 when static latch 75 is rotated and stops against the stop 57 portion of the central hub 49 which aligns the drive pins 61 of the holder 60 with the drive holes 41 of the cam plate 25 and allows retrieval of the closure 10. When extending the leaves 37, the 90° rotation of the cam plate 25 and holder 60 aligns the static latch (or latches) 75 with the slots 53. The cam plate 25 stops by the leaf pins 38 reaching the end of the cam slot 28 travel. The holder 60 can then be disconnected from the plug body 20 by retracting the boring bar 100.

In both the moveable and static latch designs, the bypass 43 slides on the lower surface 29 of the cam plate 25 during the 90° clockwise rotation until the bypass 43 contacts the next drive pin 61 on the holder 60. Once the holder 60 is lifted off the plug body 20, the bypass 43 closes and locks the cam plate 25, preventing the plate 25 from rotating. This, in turn, prevents the extended leaves 37 from moving toward the retracted first position. The bypass 43 remains closed and cannot open until it is once again engaged by one of the drive pins 61 of the plug holder 60 during the removal process.

Prior to setting the closure 10, in the moveable latch embodiment the plug holder 60 is mounted to the boring bar 100 of the tapping machine with the retainer rod 58 and is pulled tight into the taper 59 of the machine. The holder 60 has two pockets 67 which engage a drive ring 101 that locks the holder 60 rotationally with the boring bar 100. Two shoulder screws 69 (or similar securing means, including quick connect means) mount through the side of the boring bar 100 and keep the holder 60 mounted to the boring bar 100 after the plug body 20 is set. The retainer rod 58 pushes on a plunger 71 inside the holder 60 which allows the moveable latch 63 to extend by the latch spring 65. The latch 63 engages the groove 55 in the central hub 49 of the plug body 20 when the plug body 20 is pushed onto the holder 60.

In the static latch embodiment, the plug holder 60 is mounted to the plug body 20 by aligning the latch (or latches) 75 with the slots 53 while the leaves 37 are in the second extended position. The holder 60 is pushed by hand onto the plug body 20, thereby engaging the four drive holes 41 in the cam plate 25. The bypass 43 is partially compressed when the holder 60 reaches the spacer 50. The holder 60 is then rotated 90° counter clockwise using a wrench. During this rotation, the bypass 43 is further compressed by a chamfer (not shown) on the lower surface 29 of the cam plate 25 and is then clicked or locked into the pocket 33 in the cam plate 25 when the leaves 37 are fully retracted. The plug body 20 and holder 60 are then mounted to the tapping machine with the tapping machine's retainer rod 58 and pulled tight into the taper 59 of the machine. The holder 60 has two pockets 67 which engage the drive ring 101 and lock the holder 60 rotationally with the boring bar 100. In this embodiment, there is no need for plunger 71 and latch spring 65. The static latch 75 works like a key in a deadbolt relative to the slot 53 and stop 57 design of the central hub. The stops 57 help clock the latch 75 and position it relative to the slots 53 when retrieving the closure 10.

The plug holder 60 has four drive pins 61 which must be aligned with four holes 41 in the cam plate 25. (Note that one of the holes 41 resides over the bypass 43 and that the bypass 43 is not concentric with the plug body 20.) The ability to self-align the pins 61 with the holes 41 during removal of the closure 10 without the need for an operator to lean directly over the closure 10 is one of the benefits and unique features of the invention. In the moveable latch embodiment, this alignment occurs before the moveable latch 63 reaches the groove 55 in the central hub 49. A rotational stop in the form of a retrieval screw 59 interferes with one of the drive pins 61 as the plug holder 60 is being rotated. When the holder 60 comes to a stop, the operator knows that the drive pins 61 are aligned with the drive holes 41. In the static latch embodiment, the static latch 75 is stopped by the stops 57 and received by the slots 53 in the central hub 49 of the plug body 20, thereby aligning the pins 61 with the holes 41. In both embodiments, the cam plate 25 is still locked by the bypass 43 at this point until the holder 60 pushes down on the plug body 20, at which point the urethane spacer 50 is compressed and one of the drive pins 61 pushes down the bypass 43, compressing the bypass spring 45 and releasing the cam plate 25.

As explained earlier, with the bypass 43 compressed to be even with the lower surface 29 of the cam plate 25, the holder 60 can rotate 90° clockwise to extend the leaves 37. During this rotation, the bypass 43 slides on the lower surface 29 of the cam plate 25 and then contacts the next drive pin 41 on the plug holder 60. This next drive pin 41 keeps the bypass 43 open while the latch 63 or 75 is still engaged in the central hub 49. In the moveable latch embodiment, unthreading the retainer rod allows the plunger 71 of the plug holder 60 to be pushed up by the plunger spring 73. When the plunger 71 is pushed up it pulls the moveable latch 63 in to allow the holder 60 to be pulled off of the plug body 20. Because the holder 60 is no longer secured to the boring bar 100 with the retainer rod, the two shoulder screws 69 keep the tapping machine connected with the holder 60. When the holder 60 is lifted off the plug body 20, the bypass 43 closes, interferes with the cam plate 25, and retains the leaves 37 the fully extended position.

Setting the Closure

The method of setting closure 10 is similar but not identical for both of the embodiments illustrated here. For the moveable latch embodiment, the plug holder 60 is installed on the end of the boring bar 100 of the tapping machine. The plug body 20 is then mounted to the holder 60. For the static latch embodiment, the plug holder 60 is installed on the plug body 20 and then mounted onto the boring bar 100 of the tapping machine. The tapping machine is installed on the valve (not shown) above the flange 80 with the plug body 20 properly oriented so that its anti-rotation slots 51 engage the anti-rotation slots 91 of the flange 80. The plug body 20 is lowered into the flange 80 by extending the boring bar 100 until the plug body 20 stops against the ledge 83 in the flange 80.

The plug body 20 is rotated counter-clockwise to check that the anti-rotation slots 51, 91 are engaged with one another. The boring bar 100 must push down on the plug body 20 and rotate 90° clockwise to extend the leaves 37 into the groove 85 the flange 80. The crank (not shown) comes to a hard stop when the leaves 37 are fully extended. For the static latch embodiment, the boring bar 100 is then rotated about 27° (three turns of the crank) counter clockwise and the plug body 20 is pulled up to check that the leaves 37 are extended in the groove 85.

The boring bar 100 is then rotated clockwise so that leaves 37 are once again in fully extended position. The holder 60 is then lifted off the plug body 20. For the moveable latch embodiment, the leaves 37 are checked for engagement while being fully extended. The retainer rod 58 is then unthreaded and the boring bar 100 is retracted, thereby pulling the plug holder 60 off the plug body 20. Pressure is relieved from the top side of the plug body 20 and, once it is verified that the bypass 43 is not leaking, the boring bar 100 is retracted back up through the valve. The tapping machine is removed from the stack-up and the holder 60 is removed from the boring bar 100. The valve is replaced by a blind flange (not shown) for a permanent seal.

Retrieving the Closure

The method of retrieving closure 10 is substantially the same for both of the embodiments illustrated here. The plug holder 60 is installed on the end of the boring bar 100 of a tapping machine. The drive ring tabs 103 of the boring bar 100 are oriented in line with the direction of the pipeline. The tapping machine is then installed on the valve above the fitting and the pressure is equalized through a 2-inch line connected to the pipeline (not shown) the plug holder 60 is lowered by extending the tapping machine's boring bar 100 until the holder 60 (in the static latch embodiment) contacts the upper end 21 of the plug body 20 or (in the moveable latch embodiment) the holder drive pins 61 contact the upper surface 27 of the cam plate 25. The boring bar 100 is then rotated until the static latch 75 stops against the rotational stops 57 built into the central hub 49 of the plug body 20 (or, in the case of the moveable latch embodiment, until one of the drive pins 61 contacts the retrieval screw 31 located on the upper surface 27 of the cam plate 25). The boring bar 100 is then advanced until the holder 60 stops against the hub 49 and one of the drive pins 61 pushes down the bypass 43, unlocking the cam plate 25. The boring bar 100 is then rotated counter clockwise to retract the leaves 37 from the groove 85 in the flange 80, until a hard stop is felt. The boring bar 100 is retracted, pulling the closure 10 and holder 60 up through the valve. The valve is closed, the tapping machine is removed from the stack-up, and the closure 10 and holder 60 are removed from the tapping machine.

What is claimed is:

1. An improved machine-actuated removable safety closure for a tubular member, the closure including a plurality of cam-actuated leaves residing above a cam plate of a plug body of the closure, the cam plate including drive holes for receiving respective drive pins of a rotatable plug holder, the drive pins of the rotatable plug holder engaging the drive holes of the cam plate and moving the plurality of cam-actuated leaves between a retracted first position and an expanded second position as the rotatable plug holder rotates between a start position and an end position, the improvement comprising:
    the rotatable plug holder having a latch;
    the plug body having a central hub with means for receiving the latch;
    a bypass valve located within the plug body; and
    a first and a second anti-rotation slot, the first anti-rotation slot being located on an external circumferential surface of the plug body, the second anti-rotation slot being located on an internal circumferential surface of a flange of a tubular member which receives the plug body;
    wherein the latch when received by the receiving means aligns at least one of the drive pins of the rotatable plug holder above a respective drive hole of the cam plate, the first and second anti-rotation slots arranged to interlock with one another and prevent relative rotation of the plug body relative to the flange when the plug body is in a final sealing position;
    and wherein the bypass valve when in a closed position interferes with movement of the plurality of cam-actuated leaves.

2. An improved machine-actuated removable safety closure for a tubular member, the closure including a plurality of cam-actuated leaves residing above a cam plate of a plug body of the closure, the cam plate including drive holes for receiving respective drive pins of a rotatable plug holder, the drive pins of the rotatable plug holder engaging the drive holes of the cam plate and moving the plurality of cam-actuated leaves between a retracted first position and an expanded second position as the rotatable plug holder rotates between a start position and an end position, the improvement comprising:
    the rotatable plug holder having a latch;
    the plug body having a central hub with means for receiving the latch; and
    a bypass valve;
    wherein the latch when received by the receiving means aligns at least one of the drive pins of the rotatable plug holder above a respective drive hole of the cam plate
    and wherein the bypass valve when in a closed position interferes with movement of the plurality of cam-actuated leaves.

3. An improvement according to claim 2 further comprising a rotational stop, wherein the rotational stop aligns at least one of the drive pins of the rotatable plug holder above a respective drive hole of the cam plate prior to the latch engaging the receiving means.

4. An improvement according to claim 3 wherein the rotational stop is located on an upper surface of the cam plate.

5. An improvement according to claim 3 wherein the rotational stop is located on an upper surface of the plug body.

6. An improvement according to claim 2 wherein the latch is a static latch.

7. An improvement according to claim 2 further comprising means for temporarily securing the rotatable plug holder to a boring bar of a tapping machine.

8. An improvement according to claim 2 wherein the bypass valve is not concentric with the plug body.

9. An improvement according to claim 2 further comprising a first and a second anti-rotation slot;
    the first anti-rotation slot being located on an external circumferential surface of the plug body;
    the second anti-rotation slot being located on an internal circumferential surface of a flange of a tubular member which receives the plug body;
    the first and second anti-rotation slots arranged to interlock with one another.

10. An improved machine-actuated removable safety closure for a tubular member, the closure including a plurality of cam-actuated leaves residing above a cam plate of a plug body of the closure, the cam plate including drive holes for receiving respective drive pins of a rotatable plug holder, the drive pins of the rotatable plug holder engaging the drive holes of the cam plate and moving the plurality of cam-actuated leaves between a retracted first position and an expanded second position as the rotatable plug holder rotates between a start position and an end position, the improvement comprising:
    a first and a second anti-rotation slot;
    the first anti-rotation slot being located on an external circumferential surface of the plug body;
    the second anti-rotation slot being located on an internal circumferential surface of a flange of a tubular member which receives the plug body;
    the first and second anti-rotation slots arranged to interlock with one another and prevent relative rotation of the plug body relative to the flange when the plug body is in a final sealing position; and
    a bypass valve, the bypass valve when in a closed position interfering with movement of the plurality of cam-actuated leaves.

11. An improvement according to claim 10 further comprising:
    the rotatable plug holder having a latch; and
    the plug body having a central hub with means for receiving the latch;
    wherein the latch when received by the receiving means aligns at least one of the drive pins of the rotatable plug holder above a respective drive hole of the cam plate.

12. An improvement according to claim 10 further comprising a rotational stop, wherein the rotational stop aligns at least one of the drive pins of the rotatable plug holder above a respective drive hole of the cam plate prior to the latch engaging the receiving means.

13. An improvement according to claim 12 wherein the rotational stop is located on an upper surface of the cam plate.

14. An improvement according to claim 12 wherein the rotational stop is located on an upper surface of the plug body.

15. An improvement according to claim 10 wherein the latch is a static latch.

16. An improvement according to claim 10 further comprising means for temporarily securing the rotatable plug holder to a boring bar of a tapping machine.

17. An improvement according to claim 10 wherein the bypass valve is not concentric with the plug body.

* * * * *